(12) United States Patent
Yagyu et al.

(10) Patent No.: US 8,946,340 B2
(45) Date of Patent: *Feb. 3, 2015

(54) GLASS FLAKE FILLER, AND RESIN COMPOSITION INCLUDING THE SAME

(75) Inventors: Tomohiro Yagyu, Tokyo (JP); Nobuaki Tai, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 526 days.

This patent is subject to a terminal disclaimer.

(21) Appl. No.: 12/224,970

(22) PCT Filed: Mar. 22, 2007

(86) PCT No.: PCT/JP2007/055889
§ 371 (c)(1),
(2), (4) Date: Dec. 5, 2008

(87) PCT Pub. No.: WO2007/111221
PCT Pub. Date: Oct. 4, 2007

(65) Prior Publication Data
US 2009/0088515 A1    Apr. 2, 2009

(30) Foreign Application Priority Data
Mar. 24, 2006 (JP) .................. 2006-083510

(51) Int. Cl.
*C08K 3/36* (2006.01)
*B32B 5/16* (2006.01)
*C03B 37/005* (2006.01)
*C08K 3/40* (2006.01)
*C08K 7/00* (2006.01)

(52) U.S. Cl.
CPC .............. *C03B 37/005* (2013.01); *C08K 3/40* (2013.01); *C08K 7/00* (2013.01)
USPC .......................................... 524/494; 428/402

(58) Field of Classification Search
CPC .............. C08K 3/36; C08K 3/20; C08K 3/34; C08K 3/0033; C08K 3/40; C08K 7/00; C03B 37/005

USPC ................................... 524/494, 847; 428/402
See application file for complete search history.

(56) References Cited

U.S. PATENT DOCUMENTS

| | | | | |
|---|---|---|---|---|
| 2,863,783 | A * | 12/1958 | Greenstein | 106/157.7 |
| 5,002,827 | A * | 3/1991 | Shimada et al. | 428/407 |
| 2004/0134385 | A1* | 7/2004 | Anselmann et al. | 106/415 |
| 2004/0170838 | A1 | 9/2004 | Ambrosius et al. | |
| 2005/0049133 | A1 | 3/2005 | Fujiwara et al. | |
| 2005/0176850 | A1* | 8/2005 | Schmidt et al. | 523/160 |
| 2009/0056591 | A1 | 3/2009 | Schmidt et al. | |

FOREIGN PATENT DOCUMENTS

| | | |
|---|---|---|
| EP | 0 289 240 | 11/1988 |
| JP | 6-009791 A | 1/1994 |
| JP | 2002-226732 A | 8/2002 |
| JP | 2003-082260 A | 3/2003 |
| JP | 2005-097080 A | 4/2005 |
| JP | 2006-316228 A | 11/2006 |
| JP | 2009-527605 | 7/2009 |
| WO | WO 2004/092284 A1 | 10/2004 |
| WO | WO 2007/054379 | 5/2007 |

* cited by examiner

*Primary Examiner* — Ling Choi
*Assistant Examiner* — Chun-Cheng Wang
(74) *Attorney, Agent, or Firm* — Hamre, Schumann, Mueller & Larson, P.C.

(57) ABSTRACT

A glass flake filler of the present invention is composed of glass flakes. The average thickness of the glass flakes is at least 0.1 μm but less than 0.5 μm, and the glass flakes include glass flakes having a thickness of at least 0.01 μm but not more than 2.0 μm in an amount of at least 90% by mass. A resin composition of the present invention is a resin composition including a thermoplastic resin and a glass flake filler. This glass flake filler is composed of glass flakes, the average thickness of the glass flakes is at least 0.1 μm but less than 0.5 μm, and the glass flakes include glass flakes having a thickness of at least 0.01 μm but not more than 2.0 μm in an amount of at least 90% by mass.

7 Claims, 3 Drawing Sheets

GLASS FLAKE FILLER, AND RESIN COMPOSITION INCLUDING THE SAME

TECHNICAL FIELD

The present invention relates to a glass flake filler, and a resin composition including this glass flake filler.

BACKGROUND ART

Conventionally, glass flake fillers are used in a wide range of applications. For example, a glass flake filler is mixed in a resin as a reinforcing material. As a specific example, if glass flakes are mixed in a thermoplastic resin, a resin molded product having high strength and good dimensional stability can be obtained.

For example, JP 06 (1994)-9791 A discloses a resin composition obtained by mixing a glass flake filler in a thermoplastic resin. This glass flake filler is composed of glass flakes having an average particle diameter of 10 μm to 2000 μm and an average thickness of 0.8 μm to 1.4 μm, and the glass flakes include glass flakes having a thickness of 0.3 μm to 3.0 μm in an amount of at least 90% by mass. JP 2003-82260 A also discloses a resin composition obtained by granulating glass flakes having an average thickness of 0.5 μm to 20 μm and mixing the granular glass flakes in a thermoplastic resin. The reinforcing effect of the glass flakes included in these resin compositions achieves a high tensile strength and flexural strength of the resin molded products produced using the resin compositions. Furthermore, because of their low shrinkage at the time of being molded (hereinafter referred to as "molding shrinkage"), resin molded products that have excellent dimensional stability can be produced from these resin compositions.

However, since the above-mentioned conventional resin compositions may be unsatisfactory in strength and molding shrinkage for some application purposes, a resin composition capable of achieving a much higher strength and a much lower molding shrinkage is required.

DISCLOSURE OF INVENTION

Under these circumstances, it is an object of the present invention to provide a glass flake filler capable of further enhancing a reinforcing effect of a resin and further reducing a molding shrinkage of a resin. It is another object of the present invention to provide a resin composition having a much higher strength and a much lower molding shrinkage.

Figure 4:
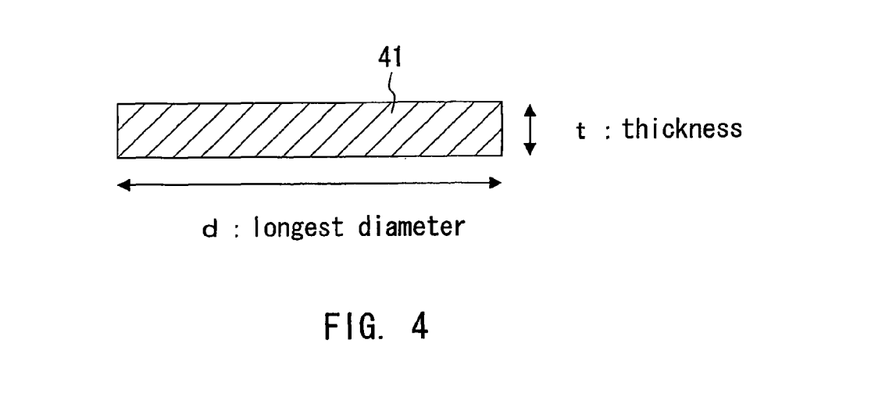
FIG. 4 is a schematic diagram showing the thickness and the longest diameter of a glass flake.

A glass flake filler of the present invention is composed of glass flakes. The average thickness of the glass flakes is at least 0.1 μm but less than 0.5 μm, and the glass flakes include glass flakes having a thickness of at least 0.01 μm but not more than 2.0 μm in an amount of at least 90% by mass. In the present description, the average thickness of glass flakes is a value obtained in the following manner. 100 or more samples of glass flakes are drawn from a glass flake filler. The thickness of each of these glass flakes is measured using a scanning electron microscope (SEM), and the total of the measured thicknesses are divided by the number of the glass flakes. The thickness of a glass flake to be measured is a thickness "t" of a glass flake 41 shown in FIG. 4.

How to obtain the relationship between the thickness of glass flakes included in a glass flake filler and the content of the glass flakes in the present invention are described as follows. First, 100 or more samples of glass flakes are drawn, and the thickness of each of these glass flakes is measured using an SEM. The thickness to be measured at this time is the same as the thickness described above (see FIG. 4). Next, the number of glass flakes having a thickness in a prescribed thickness range (of at least 0.01 μm but not more than 2.0 μm in this case) is divided by the number of all the measured glass flakes. Thus the relationship between the thickness of the glass flakes and the content thereof is obtained.

The glass flake filler of the present invention is composed of glass flakes having a very small average thickness, as described above. In addition, the respective glass flakes included in the filler vary only slightly in thickness. In other words, the glass flake filler of the present invention has a larger specific surface area (surface area per unit volume) than the conventional glass flake fillers. Therefore, the contact area between the filler and a resin increases when the filler is mixed in the resin, so that the resin reinforcing effect can be improved and the molding shrinkage of the resin can be reduced.

A resin composition of the present invention is a resin composition including a thermoplastic resin and a glass flake filler. The glass flake filler is composed of glass flakes, the average thickness of the glass flakes is at least 0.1 μm but less than 0.5 μm, and the glass flakes include glass flakes having a thickness of at least 0.01 μm but not more than 2.0 μm in an amount of at least 90% by mass. It should be noted that the average thickness of the glass flakes included in the resin composition of the present invention is a value that is calculated in the same manner as in the above-mentioned average thickness of glass flakes.

Since the resin composition of the present invention includes the glass flake filler of the present invention as described above, it can be realized as a resin composition having a high strength and a low molding shrinkage. In addition, the glass flakes included in the resin composition of the present invention are thinner than the conventional ones. Therefore, when a resin molded product is produced using this resin composition, the limits of the thickness and size of the molded product can be relaxed more than ever before. Furthermore, the fact that the glass flakes included in the resin composition of the present invention are thinner than the conventional glass flakes can provide another advantage. Even if the resin composition of the present invention has a lower content of glass flakes than the conventional resin compositions, it still can achieve a molding shrinkage that is equal to or lower than that of the conventional ones.

BEST MODE FOR CARRYING OUT THE INVENTION

Hereafter, embodiments of the present invention will be described.

Embodiment 1

In Embodiment 1, a glass flake filler of the present invention is described.

A glass flake filler of the present embodiment is composed of glass flakes. The average thickness of the glass flakes is at least 0.1 μm but less than 0.5 μm, and the glass flakes include glass flakes having a thickness of at least 0.01 μm but not more than 2.0 μm in an amount of at least 90% by mass. This glass flake filler is composed of glass flakes having a very small average thickness. In addition, the glass flakes included in the filler vary only slightly in thickness. Therefore, when this glass flake filler is mixed in a resin, it not only exerts a high reinforcing effect but also is highly effective in reducing the molding shrinkage of the resin mixed with the filler. For example, in the case where the glass flake filler includes glass flakes having a thickness of at least 0.05 μm but not more than 1.0 μm in an amount of at least 90% by mass, the glass flake filler can achieve a sufficiently high reinforcing effect and low molding shrinkage of a resin when it is mixed in the resin. In addition, the glass flakes constituting the glass flake filler of the present embodiment are very thin. Therefore, when the glass flakes are mixed in a resin to produce a resin molded product, the limits of the thickness and size of the molded product are more relaxed than ever before.

As the glass flakes constituting the glass flake filler of the present embodiment, it is desirable to use glass flakes having an average particle diameter of at least 5 μm but not more than 1000 μm, for example. In the case of the average particle diameter of at least 5 μm, a high reinforcing effect can be obtained when such flakes are mixed in a resin. In the case of the average particle diameter of 1000 μm, or less, their dispersibility in a resin improves. Therefore, it is possible to obtain more effectively the resin reinforcing effect and the molding shrinkage reducing effect. When the average particle diameter exceeds 1000 μm, it becomes difficult to agglomerate glass flakes by a binder treatment to granulate them. In order to granulate glass flakes, the average particle diameter thereof preferably is 1000 μm or less. It should be noted that in the present description, a particle diameter of a glass flake means the longest diameter of the glass flake, and corresponds to a length "d" of a glass flake 41 shown in FIG. 4.

It is preferable that the aspect ratio (the average particle diameter to the average thickness) of the glass flake filler of the present embodiment be in a range of 10 to 2000. A glass flake filler having an aspect ratio of 10 or higher effectively serves as a resin reinforcing material. A glass flake filler having an aspect ratio of 2000 or lower has a good dispersibility in a resin. Therefore, the glass flake filler having an aspect ratio of 2000 or lower effectively can achieve the resin reinforcing effect and the molding shrinkage reducing effect.

The glass composition to be used for the glass flake filler of the present embodiment is not particularly limited. For example, any of an E-glass composition, a C-glass composition, and an A-glass composition can be used.

The glass flakes constituting the glass flake filler of the present embodiment may have a metal and/or metal oxide thin film formed on the surface thereof. For example, in the case where a glass flake contains a substantial amount of an alkaline component (an alkali metal or an alkali earth metal) as a composition component, the alkaline component is eluted from the surface of the glass flake over time, which may cause problems such as a decrease in adhesiveness between the resin and the filler and a color defect of a resin composition. So, if a thin film of $SiO_2$ or the like is formed previously on the surface of a glass flake, the elution of an alkaline component can be suppressed, and thereby the above-mentioned problems can be prevented. The forming of such a thin film adds a luster color tone to a glass flake. Therefore, if a glass flake filler including glass flakes coated with such a thin film is mixed in a resin, a resin molded product that has a varying appearance can be produced.

Next, a method of producing the glass flake filler of the present embodiment will be described.

The glass flake filler of the present embodiment can be produced using a blowing method, for example. The blowing method is a technique in which a molten glass base material which is continuously taken out from a molten glass batch is extended while being inflated into a hollow shape so as to obtain a thin glass film. By crushing the glass film obtained by this method, the glass flake filler of the present embodiment can be produced.

Figure 1:
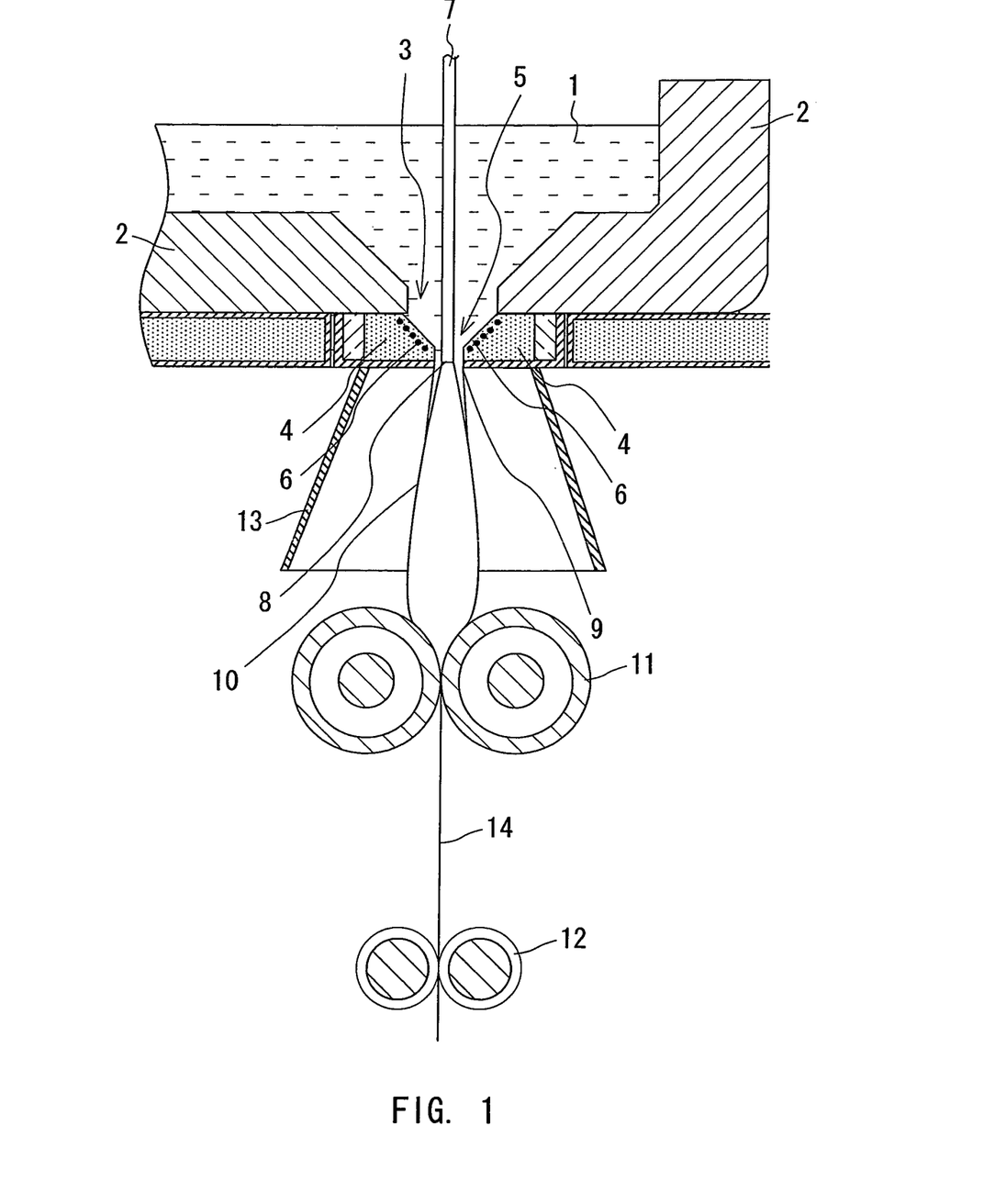
FIG. 1 is a partial cross-sectional view schematically showing an example of an apparatus for producing a glass flake filler of the present invention.

FIG. 1 shows an example of an apparatus for producing a glass film by the blowing method. In FIG. 1, 1 is a molten glass base material, 2 is a fire-resistant furnace bath, 3 is a hole provided on the bottom of the furnace bath. 4 is a feeder block having a circular glass outlet opening 5 that is smaller than the hole 3. The feeder block 4 is made of refractory cast brick in which electric heating wires are embedded. The temperature of the molten glass base material at the glass outlet opening 5 is kept constant with the electric heating wires 6. 7 is a blow nozzle disposed from above the fire-resistant furnace bath 2 to the glass outlet opening 5 through the hole 3. The tip 8 of the blow nozzle 7 forms a circular slit 9 in the glass outlet opening 5. The molten glass base material coming out of the slit 9 is inflated with gas (for example, air) fed through the blow nozzle 7, so as to be a hollow shape. Then, the resultant hollow glass is extended downward so as to make the thickness of the resultant film very thin. 11 is a pair of pressure rollers, and 12 is a pair of extension rollers. 13 is a divergent cylindrical steel reflecting plate. The hollow glass 10 is not only blocked from outside airflow but also kept hot enough by the reflecting plate 13, which results in a uniformly-inflated thin hollow glass. The hollow glass 10 thus inflated is pressed flat by the pressure rollers 11, and the resultant flat glass film 14 is discharged. The glass film thus obtained is crushed into particles of diameters in a predetermined range. Thereby, glass flakes can be obtained.

In order to produce a thin glass flake filler as described in the present embodiment using the above-mentioned apparatus, the following methods can be used. For example, a hollow glass is extended at a higher rate, or gas is fed through the blow nozzle with a higher pressure so as to inflate the hollow glass fully.

Figure 2:
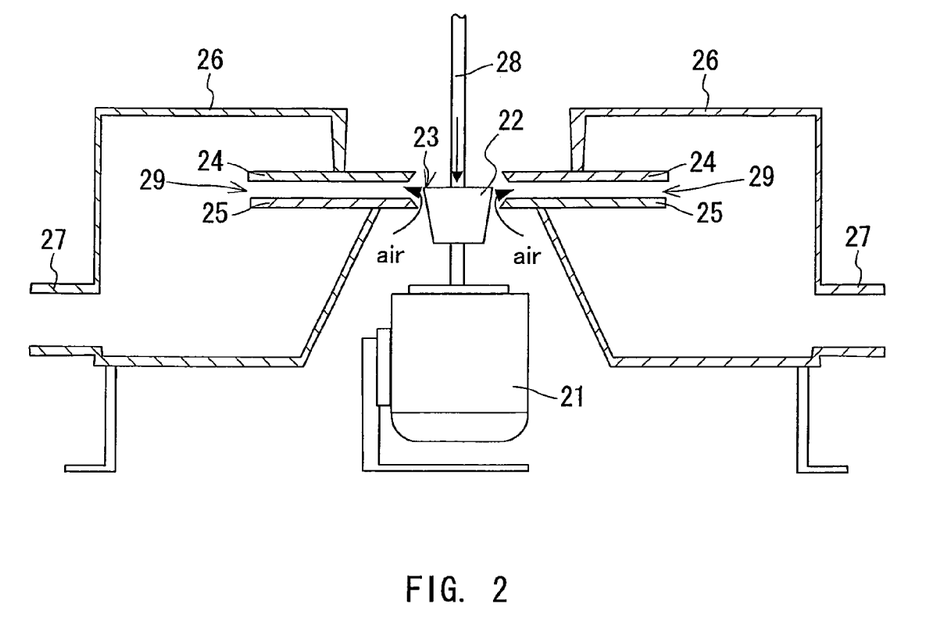
FIG. 2 is a partial cross-sectional view schematically showing another example of an apparatus for producing a glass flake filler of the present invention.

The glass flake filler of the present embodiment also can be produced using a method different from the above-mentioned method. For example, a thin glass film is produced by utilizing a flow of molten glass produced by centrifugal force, and the obtained glass film is crushed. A glass flake filler thus may be produced. FIG. 2 shows an example of an apparatus for producing a glass flake filler using the flow of molten glass. This apparatus has a tapered cup 22 mounted to a variable-speed electric motor 21. The rim 23 of the cup 22 is located between two circular plates 24 and 25. Since the upper plate 24 is mounted in such a manner that it can move up and down, the distance between the plates 24 and 25 can be adjusted. The plates 24 and 25 are mounted in a cyclone type vacuum chamber 26. This chamber 26 is connected, via an outlet connecting portion 27, to a cyclone collection/separation vacuum pump not shown in this diagram. The cup 22 is rotated at a predetermined speed, and molten glass 28 is poured into the cup 22 from above. The molten glass is transported outward by the centrifugal force and spills over the rim 23 of the cup 22. The cyclone collection/separation vacuum pump is activated to reduce the gas pressure inside the chamber 26, thereby feeding air into the chamber 26 through the gap 29 between the plates 24 and 25. The air fed into the chamber 26 rapidly cools the molten glass transported over the rim 23 of the cup 22. Furthermore, the airflow between the plates 24 and 25 also works to keep the molten glass from coming in contact with the surfaces of the plates 24 and 25 when it is transported over the rim 23 of the cup 22 and is located between the plates 24 and 25. The airflow between the plates 24 and 25 cools the molten glass located between the plates 24 and 25 until it turns into a solid state. The glass located between the plates 24 and 25 is pulled out in the radial direction by the friction with the airflow, and then crushed into small glass flakes while being kept flat by the airflow. The glass flakes thus obtained are collected in the chamber 26 and delivered to a cyclone collection filter portion not shown in the diagram via the outlet connecting portion 27.

When glass flakes are produced using this apparatus, the thickness of the glass flakes can be adjusted by adjusting factors such as the distance between the plates 24 and 25 and the speed of the airflow between the plates 24 and 25.

The glass flake filler of the present embodiment may include granulated glass flakes. A glass flake filler is subjected to a binder treatment so that the glass flakes are bonded with each other by a binder to granulate them. Thus granular glass flakes can be produced. Since such granular glass flakes hardly scatter, they are excellent in workability, and are also excellent in dispersibility in a resin. In addition, the granulation of glass flakes improves the feeding efficiency, thereby allowing more reliable quantitative feeding.

The binder used here includes a surfactant and a binding component. As the surfactant, any of an anionic surfactant, a cationic surfactant, an amphoteric surfactant, and a nonionic surfactant can be used. A nonionic surfactant is particularly preferred in that it suppresses the agglomeration of a binder so as to stabilize it when an epoxy resin or a urethane resin is used as a binding component. Examples of anionic surfactants include dioctyl sodium sulfosccinate, fatty acid salt, alkyl sulfate ester salt, alkyl sulfonate, alkyl aryl sulfonate, alkyl naphthalene sulfonate, alkyl sulfosccinate, alkyl diphenyl ether disulfonate, alkyl phosphate, polyoxyethylene alkyl sulfate ester salt, polyoxyethylene alkylallyl sulfate ester salt, and sulfosuccinate ester salt. Examples of cationic surfactants include higher amine halogenate, alkylpyridinium halide, and quaternary ammonium salt. Examples of amphoteric surfactants include lauryl amino propionate, and lauryl dimethyl betaine. Examples of nonionic surfactants include: polyoxyethylene glycol alkyl ethers such as polyoxyethylene laurylether, polyoxyethylene higher alcohol ether, and polyoxyethylene octylphenyl ether; polyethylene glycol fatty acid esters such as polyethylene glycol monostearate; sorbitan fatty acid esters such as sorbitan monolaurate, and polyoxyethylene sorbitan monolaurate; glycol fatty acid esters such as glycol monostearate; and fatty acid monoglycerides. Two or more of these surfactants may be used in combination.

A binding component in a binder is not particularly limited. Examples of organic binding components include methyl cellulose, carboxymethyl cellulose, starch, carboxymethyl starch, hydroxyethyl cellulose, hydroxypropyl cellulose, polyvinyl alcohol, silane coupling agent, acrylic resin, epoxy resin, phenolic resin, vinyl acetate, and polyurethane resin. Examples of inorganic binding components include water glass, colloidal silica, colloidal alumina, and aminosilane. Among them, a binding component including a silane coupling agent, an epoxy resin, or a polyurethane resin is preferred. A silane coupling agent is an organic silicon compound having at least two types of reactive groups in a molecule. One of the at least two types of reactive groups reacts with the surface of a glass flake, and the other types of reactive groups react with an organic binding component and a thermoplastic resin. Therefore, such a silane coupling agent improves the affinity between the glass flakes and the thermoplastic resin. An epoxy resin and a polyurethane resin have a good affinity for a silane coupling agent and a thermoplastic resin. The combined use of them allows glass flakes to bond strongly with the thermoplastic resin, thereby fully functioning as a reinforcing material.

The concentration of a binder usually is adjusted using water or alcohol as a solvent so that respective components can be present uniformly on the surface of a glass flake. Specifically, the concentration thereof preferably is 1 to 10% by mass in terms of solid content percentage.

The method of producing a binder is not particularly limited. A binder is produced by adding as appropriate a binding component, a surfactant and others into a solvent at room temperature and normal atmospheric pressure and then stirring the resultant solution until all the components are blended uniformly.

The adhesion amount of a binder to a granular glass flake is 0.1 to 2% by mass in terms of solid content percentage by mass. Assuming that the adhesion amount of the binder is at least 0.1% by mass, sufficient binding force can be obtained between glass flakes, and thereby the scattering of the glass flakes can be suppressed. On the other hand, when assuming that the adhesion amount of the binder is at most 2% by mass, it is possible to prevent such problems as the production of gas upon extrusion molding, which causes contamination of a mold or color defect of a resin composition.

The method of producing granular glass flakes is not particularly limited. They can be produced by known methods. For example, various methods such as a stirring granulation method, a fluidized bed granulation method, a spraying granulation method, and a tumbling granulation method can be used. A specific example of these methods is as follows. An appropriate amount of a binder is applied to glass flakes using a spray or the like, and then the glass flakes are poured into a tumbling drum or a vibrating tray. Thereafter, the glass flakes are granulated while being heated to evaporate a solvent. Granular glass flakes of desired size can be produced by adjusting as appropriate various conditions such as the tumbling speed of the tumbling drum or the vibration frequency of the vibrating tray, and the evaporation rate of the solvent (which is approximately proportional to the heating temperature).

The glass flake filler of the present embodiment may be subjected to a surface treatment by a surface treatment agent. This surface treatment can improve the properties of the glass flake filler such as a reinforcing effect. As a surface treatment agent, various types of commercially available surface treatment agents can be adopted. Specific examples of such surface treatment agents include silicon-based coupling agents such as γ-aminopropyltriethoxysilane, vinyltriethoxysilane, and γ-(methacryloxypropyltrimethoxysilane, and titanium-based coupling agents. The amount of each of these surface treatment agents to be used is, for example, 0.05 to 0.20% by mass of the total mass of glass flakes.

Embodiment 2

In Embodiment 2, a resin composition of the present invention will be described.

The resin composition of the present embodiment includes a glass flake filler and a thermoplastic resin. The glass flake filler described in Embodiment 1 also can be used as the glass flake filler in Embodiment 2.

The thermoplastic resin to be used in Embodiment 2 is not particularly limited. Examples of thermoplastic resins include polyvinyl chloride, polypropylene, polyethylene, polystyrene, polyester, polyamide, polycarbonate, polybutylene, polybutylene terephthalate, and a copolymer of these materials. Among them, polybutylene terephthalate is preferred because it shows a significant improvement in warpage and dimensional stability of a molded product when it is blended with a glass flake filler.

The content of the glass flake filler in the resin composition is preferably 5 to 70% by mass. When the content of the glass flake filler is at least 5% by mass, the glass flake filler can fully exert its function as a reinforcing material. On the other hand, when the content thereof is 70% or less by weight, the glass flake filler can be dispersed uniformly in the resin composition. In order to keep the molding shrinkage lower, it is more preferable that the content of the glass flake filler is at least 30% by mass.

The resin composition may include a reinforcing material such as glass fiber other than a glass flake filler depending on the intended use. An example of such a material is glass fiber. For example, when a reinforcing material is used for components of electric/electronic devices, it is required to have a very high strength. Therefore, an approximately equal amount of glass fiber and glass flake filler may be blended.

The reinforcing effect of the glass flake filler can give a sufficient tensile strength and flexural strength to the resin molded product produced by using the resin composition of the present embodiment. In addition, the resin composition of the present embodiment has a low molding shrinkage, and therefore provides an excellent dimensional stability for a resin molded product produced from the resin composition. Furthermore, the average thickness of glass flakes included in the resin composition of the present embodiment is thinner than ever before. Therefore, the resin composition of the present embodiment can provide the resin molded product with a less rough surface, that is, a smooth surface.

EXAMPLES

Hereafter, the present invention will be described in further detail with reference to Examples.

Examples 1 and 2, and Comparative Examples 1 and 2

By using the apparatus shown in FIG. 1, glass flake fillers having the average thicknesses and thickness distributions of glass flakes as shown in Table 1 were produced from a glass raw material of a C-glass composition, while the extension rate and the pressure of gas to be fed through the blow nozzle were being adjusted as appropriate. The average particle diameters of the glass flakes of Examples 1 and 2 and Comparative Examples 1 and 2 were all 150 μm.

The above glass flake fillers were subjected to a surface treatment using aminosilane (a surface treatment agent of 0.10% by mass). These glass flake fillers were blended respectively with polybutylene terephthalate (PBT resin) to produce resin compositions of Examples 1 and 2 and Comparative Examples 1 and 2. The contents of the glass flake fillers in these resin compositions were all 30% by mass. These resin compositions were each poured into a metallic mold of 60 mm×60 mm×3 mm so as to form a molded product. Then, the tensile strength, flexural strength, and flexural modulus of each of these molded products were measured. The tensile strength was measured according to JIS K 7161. The flexural strength and flexural modulus were measured according to JIS K 7171. Table 2 shows the measurement results.

TABLE 2

|  | Example 1 | Example 2 | Comparative Example 1 | Comparative Example 2 |
| --- | --- | --- | --- | --- |
| Tensile strength (MPa) | 79 | 76 | 72 | 66 |
| Flexural strength (MPa) | 139 | 135 | 130 | 119 |
| Flexural modulus (GPa) | 8.1 | 7.9 | 7.5 | 6.7 |

The above measurement results are summarized as follows. The resin compositions (of Examples 1 and 2) were each produced using a glass flake filler that is composed of glass flakes having an average thickness of at least 0.1 μm but less than 0.5 μm and including glass flakes with a thickness of at least 0.01 μm but not more than 2.0 μm in an amount of at least 90% by mass. On the other hand, the resin compositions (of Comparative Examples 1 and 2) were each produced using a glass flake filler that is composed of glass flakes having a larger thickness. The measurement results showed that the resin compositions (of Examples 1 and 2) were higher than the resin compositions (of Comparative Examples 1 and 2) in tensile strength, flexural strength and flexural modulus.

Examples 3 and 4, and Comparative Examples 3 and 4

By using the apparatus shown in FIG. 1, glass flake fillers having the average thicknesses and thickness distributions of glass flakes as shown in Table 3 were produced from a glass raw material of an E-glass composition, while the extension rate and the pressure of gas to be fed through the blow nozzle were being adjusted as appropriate. The average particle diameters of the glass flakes of Examples 3 and 4 and Comparative Examples 3 and 4 were all 40 μm.

TABLE 1

|  | Example 1 | Example 2 | Comparative Example 1 | Comparative Example 2 |
| --- | --- | --- | --- | --- |
| Average thickness (μm) | 0.2 | 0.4 | 1.3 | 3.5 |
| Thickness distribution | Thickness of 0.05 to 0.6 μm in an amount of at least 90% by mass | Thickness of 0.1 to 0.8 μm in an amount of at least 90% by mass | Thickness of 0.5 to 2.0 μm in an amount of at least 90% by mass | Thickness of 2.0 to 6.0 μm in an amount of at least 90% by mass |

TABLE 3

|  | Example 3 | Example 4 | Comparative Example 3 | Comparative Example 4 |
|---|---|---|---|---|
| Average thickness (μm) | 0.2 | 0.4 | 0.7 | 2.0 |
| Thickness distribution | Thickness of 0.05 to 0.6 μm in an amount of at least 90% by mass | Thickness of 0.1 to 0.8 μm in an amount of at least 90% by mass | Thickness of 0.4 to 1.8 μm in an amount of at least 90% by mass | Thickness of 1.3 to 4.0 μm in an amount of at least 90% by mass |

As the glass flake fillers of Examples 3 and 4, granular glass flake fillers including a binder of 0.6% by mass were used. The glass flake fillers of Examples 3 and 4, after being granulated, had an average particle diameter of 200 μm. A binder to be used for granulating the glass flake fillers was prepared in the following manner. By using water as a solvent, an aminosilane coupling agent (Product Number A100 manufactured by Nippon Unicar Co., Ltd.), an epoxy resin (BPA type, weight per epoxy equivalent of 1800), a urethane resin (tolylene diisocyanate, ether-based solvent), and a surfactant (anionic, sodium dioctyl sulfoscccinate) were mixed in such a manner that the contents of these components were 28.4%, 28.4%, 42.6% and 0.6% by mass, respectively, in terms of solid content percentage by mass. Then, the resultant mixture was stirred well at room temperature and normal pressure until these components were blended uniformly. By using the binder thus prepared, granular glass flakes were produced by the tumbling granulation method. These granular glass flakes were mixed in a PBT resin, and thereby the resin compositions of Examples 3 and 4 were produced. On the other hand, the glass flakes of Comparative Examples 3 and 4 also were granulated in the same manner as in Examples 3 and 4, and mixed in a PBT resin so as to obtain resin compositions. The average particle diameters of the glass flakes of Comparative Examples 3 and 4 were both 200 μm, after being granulated. The contents of the glass flakes in these resin compositions were all 30% by mass.

Figure 3:
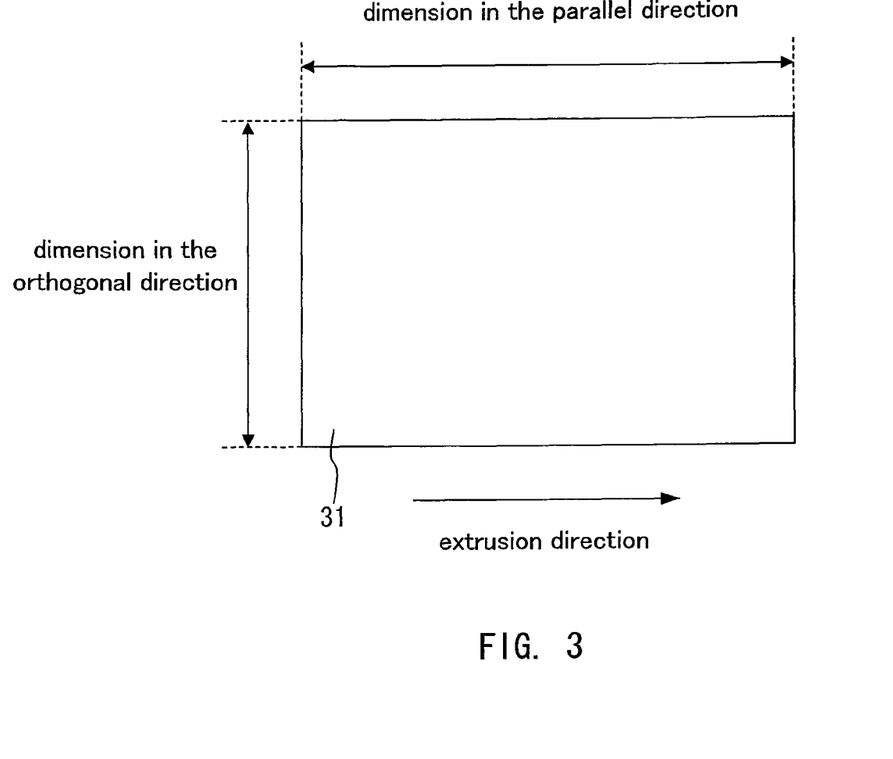
FIG. 3 is a diagram for explaining the parallel direction and the orthogonal direction in extrusion molding of a resin composition of the present invention.

These resin compositions were each poured into a metallic mold of 60 mm×60 mm×3 mm so as to form a molded product. These molded products were left for 24 hours under the conditions of a temperature of 20° C. and a humidity of 30%. Then, the dimensional changes of these resin compositions from the original dimension of the metallic mold were measured. Table 4 shows the measurement results. Here in Table 4, the direction parallel to the direction of extruding a resin composition upon forming a molded product is the "parallel direction", whereas the direction perpendicular to that extrusion direction is the "orthogonal direction". FIG. 3 shows the parallel direction and the orthogonal direction of a resin molded product 31. When a resin composition is extruded, a glass flake filler is oriented approximately along the flowing direction of the resin composition. Therefore, the improvement in dimensional stability particularly in the orthogonal direction is considered important.

TABLE 4

|  | Example 3 | Example 4 | Comparative Example 3 | Comparative Example 4 |
|---|---|---|---|---|
| Shrinkage in the orthogonal direction (%) | 0.4 | 0.48 | 0.58 | 0.64 |
| Shrinkage in the parallel direction (%) | 0.2 | 0.2 | 0.4 | 0.48 |

The above measurement results are summarized as follows. The resin compositions (of Examples 3 and 4) were each produced using a glass flake filler, after being granulated from glass flakes having an average thickness of at least 0.1 μm but less than 0.5 μm and including glass flakes with a thickness of at least 0.01 μm but not more than 2.0 μm in an amount of at least 90% by mass. On the other hand, the resin compositions (of Comparative Examples 3 and 4) were each produced using a glass flake filler that is composed of glass flakes having a larger thickness. The measurement results showed that the resin compositions (of Examples 3 and 4) were lower in molding shrinkage both in the parallel direction and the orthogonal direction, that is, better in dimensional stability, than the resin compositions (of Comparative Examples 3 and 4).

Example 5, and Comparative Examples 5 and 6

In a resin composition of Example 5, a glass flake filler produced from a glass raw material of an E-glass composition was mixed by using the apparatus shown in FIG. 1. This glass flake filler was composed of glass flakes having an average particle diameter of 40 μm and an average thickness of 0.4 μm and including glass flakes with a thickness of at least 0.1 μm but not more than 0.8 μm in an amount of at least 90% by mass. This glass flake filler was granulated in the same manner as in Examples 3 and 4, and was mixed in a PBT resin in such a manner that the contents thereof were 10%, 20%, and 30% by mass, respectively. The particle diameter of the glass flakes used in Example 5 was 200 μm, after being granulated. A binder used for granulation was the same as that used in Examples 3 and 4. The content of the binder included in the granulated glass flake filler was 0.6% by mass.

A resin composition of Comparative Example 5 was produced in the same manner as in Example 5 except that it was produced using a glass flake filler that is composed of glass flakes having an average particle diameter of 40 μm and an average thickness of 0.7 μm and including glass flakes with a thickness of at least 0.4 μm but not more than 1.8 μm in an amount of at least 90% by mass. A resin composition of Comparative Example 6 was produced in the same manner as in Example 5 except that it was produced using a glass flake filler that is composed of glass flakes having an average particle diameter of 40 μm and an average thickness of 2.0 μm and including glass flakes with a thickness of at least 1.3 μm but not more than 4.0 μm in an amount of at least 90% by mass.

These resin compositions were each poured into a metallic mold of 60 mm×60 mm×3 mm so as to form a molded product. These molded products were left for 24 hours under the conditions of a temperature of 20° C. and a humidity of 30%. Then, the dimensional changes of these resin compositions from the original dimension of the metallic mold were measured. Table 5 shows the measurement results. The definitions of the "parallel direction" and the "orthogonal direction" are the same as those in Examples 3 and 4.

TABLE 5

|  | Average thickness (μm) | Added amount | | |
| --- | --- | --- | --- | --- |
|  |  | 10% by mass | 20% by mass | 30% by mass |
| Shrinkage in the orthogonal direction (%) | 0.4 μm (Example 5) | 0.79 | 0.63 | 0.48 |
|  | 0.7 μm (Comparative Example 5) | 0.84 | 0.68 | 0.58 |
|  | 2.0 μm (Comparative Example 6) | 0.92 | 0.72 | 0.64 |
| Shrinkage in the parallel direction (%) | 0.4 μm (Example 5) | 0.35 | 0.25 | 0.20 |
|  | 0.7 μm (Comparative Example 5) | 0.46 | 0.44 | 0.40 |
|  | 2.0 μm (Comparative Example 6) | 0.53 | 0.50 | 0.48 |

These results showed that all the resin compositions of Example 5 including the glass flake filler of 10%, 20%, and 30% by mass, respectively, were better in dimensional changes in the parallel direction than the resin compositions of Comparative Examples 5 and 6. As for the dimensional changes in the orthogonal direction, comparisons were made between respective pairs of resin compositions including the same amount of the glass flake filler added thereto in Example 5, Comparative Example 5, and Comparative Example 6. Compared with the resin compositions of Comparative Examples 5 and 6, the resin composition of Example 5 had a good dimensional stability in all the cases (where the flake glass filler of 10%, 20%, and 30% by mass, respectively, were added thereto). In addition, it was also found that the dimensional stability in the orthogonal direction increases as the content of the glass flake filler increases. Furthermore, a comparison was made between the resin composition including the glass flake filler of the present invention in an amount of 20% by mass and the resin composition (Comparative Example 6) including the conventional glass flake in an amount of 30% by mass. The result showed that the resin composition including the glass flake filler of the present invention in an amount of 20% by mass had a lower molding shrinkage. Thus it was confirmed that the glass flake filler of the present invention can achieve a good dimensional stability even if the added amount thereof is less than ever before.

Furthermore, the resin composition of Example 5 including 30% by mass of the glass flake filler showed 0.5% or less of molding shrinkage in the orthogonal direction, which was a very good result. Thus it was confirmed that a resin composition including a glass flake filler in an amount of at least 30% by mass is preferred in order to achieve a good dimensional stability in both the parallel direction and the orthogonal direction.

Example 6, and Comparative Examples 7 and 8

In a resin composition of Example 6, a glass flake filler produced from a glass raw material of an E-glass composition was mixed by using the apparatus shown in FIG. 1. This glass flake filler was composed of glass flakes having an average particle diameter of 20 μm and an average thickness of 0.4 μm and including glass flakes with a thickness of at least 0.1 μm but not more than 0.8 μm in an amount of at least 90% by mass. 30% by mass of this glass flake filler and 70% by mass of polycarbonate resin were mixed, and the resultant mixture was extruded at 300° C. by using a twin-screw extruder (KZW15-30MG manufactured by Technovel Corporation). Then, the extruded mixture was pelletized using a pelletizer. The dimension of the pellets was about 1.5 mm in diameter and about 3.5 mm in length. This pellet was molded into a test sample (of 50×50×1 mm) using an injection molding machine (HM7-type manufactured by Nissei Plastic Industrial Co., Ltd.) The structure spectrum value of the surface of this sample was measured using a wavescan DOI (manufactured by BYK-GARDNER GmbH) so as to evaluate the surface roughness thereof. It is evaluated that the smaller a structure spectrum value is, the smoother a surface is. Table 6 shows the measurement result.

The resin composition of Comparative Example 7 was produced in the same manner as in Example 6 except that it was produced using a glass flake filler that is composed of glass flakes having an average particle diameter of 20 μm and an average thickness of 0.7 μm and including glass flakes with a thickness of at least 0.4 μm but not more than 1.8 μm in an amount of at least 90% by mass. The resin composition of Comparative Example 8 was produced in the same manner as in Example 6 except that it was produced using a glass flake filler that is composed of glass flakes having an average particle diameter of 20 μm and an average thickness of 1.3 μm and including glass flakes with a thickness of at least 0.5 μm but not more than 2.0 μm in an amount of at least 90% by mass. As for these resin compositions of Comparative Examples 7 and 8, the surface roughness was evaluated in the same manner as in Example 6. Table 6 shows the results.

TABLE 6

|  | Example 6 | Comparative Example 7 | Comparative Example 8 |
| --- | --- | --- | --- |
| Surface roughness (arbitrary unit) | 5 | 10 | 16 |

It was found from these results that the resin molded product of Example 6 including thin glass flakes with an average thickness of 0.4 μm has a smooth surface, compared with the resin molded products of Comparative Examples 7 and 8 including thicker glass flakes. Specifically, the surface roughness of the molded product of Example 6 including glass flakes with an average thickness of 0.4 μm was half the surface roughness of the molded product of Comparative Example 7 including glass flakes with an average thickness of 0.7 μm. This fact showed that the surface quality was improved in Example 6. Thus, it was found that the surface quality of a resin molded product improves (the surface thereof becomes smoother) as the average thickness of glass flakes to be blended therein decreases.

Industrial Applicability

The glass flake filler of the present invention is effective in reinforcing a resin, and when mixed in a resin, it improves the dimensional stability of the resultant resin molded product. Therefore, it can be used for various applications. For example, a resin composition including polycarbonate and the glass flake filler of the present invention is used suitably in the automotive field or the like. Furthermore, a resin composition including an acrylic resin and the glass flake filler of the present invention is used suitably in the dental field or the like, for example.

The invention claimed is:
1. A resin composition comprising:
polybutylene terephthalate; and
a glass flake filler,
wherein the glass flake filler comprises glass flakes,
an average thickness of the glass flakes is at least 0.1 μm but less than 0.5 μm, and
the glass flakes include glass flakes having a thickness of at least 0.05 μm but not more than 1.0 μm in an amount of at least 90% by mass.

2. The resin composition according to claim 1,
wherein the glass flake filler includes glass flakes that are granulated using a binder.

3. The resin composition according to claim 1,
wherein a content of the glass flake filler is at least 5% by mass but not more than 70% by mass.

4. The resin composition according to claim 1,
wherein the average thickness of the glass flakes is 0.2 μm, and
the glass flakes include glass flakes having a thickness of at least 0.05 μm but not more than 0.6 μm in an amount of at least 90% by mass.

5. The resin composition according to claim 1,
wherein the average thickness of the glass flakes is 0.4 μm, and
the glass flakes include glass flakes having a thickness of at least 0.1 μm but not more than 0.8 μm in an amount of at least 90% by mass.

6. The resin composition according to claim 1,
wherein the glass filler provides a resin composition in which the orthogonal direction molding shrinkage is 0.48% or less when the resin composition includes the glass flakes in the amount of 30% by mass,
wherein the average thickness of the glass flakes is at least 0.1 μm but not more than 0.4 μm, and the glass flakes include the glass flakes having a thickness of at least 0.05 μm but not more than 0.8 μm in an amount of at least 90% by mass.

7. The resin composition according to claim 1,
wherein the glass filler provides a resin composition that has parallel direction molding shrinkage of about 0.2% or less when the resin composition is obtained by mixing a resin and the glass flake filler and contains the glass flakes in an amount of 30 % by mass, where the parallel direction molding shrinkage is measured by allowing the resin composition to stand for 24 hours at temperature of 20° C. and humidity of 30%.

\* \* \* \* \*

UNITED STATES PATENT AND TRADEMARK OFFICE
CERTIFICATE OF CORRECTION

PATENT NO. : 8,946,340 B2  
APPLICATION NO. : 12/224970  
DATED : February 3, 2015  
INVENTOR(S) : Yagyu et al.

Page 1 of 1

It is certified that error appears in the above-identified patent and that said Letters Patent is hereby corrected as shown below:

In the Specification

Column 3, line 29: delete "1000 μm," and insert -- 1000 μm --.

Column 6, line 53: delete "(methacryloxypropyltrimethoxysilane," and insert -- (methacryloxypropyl)trimethoxysilane, --.

Signed and Sealed this  
Fifteenth Day of September, 2015

Michelle K. Lee  
*Director of the United States Patent and Trademark Office*